Patented June 5, 1951

2,556,134

UNITED STATES PATENT OFFICE 2,556,134

PREPARATION OF THIOETHER ESTERS

Willard J. Croxall, Bryn Athyn, and John O. Van Hook, Philadelphia, Pa., assignors to Rohm & Haas Company, Philadelphia, Pa., a corporation of Delaware No Drawing. Application October 2, 1948, Serial No. 52,605

6 Claims. (Cl. 260—481)

This invention deals with a process for the transetherification of ether esters of the formula $(RO)_nCHCH_nCOOR$ to thioether esters. In this formula R is an aliphatic hydrocarbon group, particularly a saturated hydrocarbon group, of not over eight carbon atoms and $n$ is an integer from one to two.

The process comprises reacting a said ether ester with a mercaptan, R'SH, by heating at 90° C. to 250° C. in the presence of a transetherifying catalyst and displacing the alcohol ROH from said ether ester. The group RO— is thus replaced with the group R'S—.

The ether esters which may be used are beta,beta-diether propionates $(RO)_2CHCH_2COOR$ and beta-ether acrylates $ROCH{=}CHCOOR$ There may be used individual ether esters or mixtures of the two types of ether esters.

The above propionates and acrylates are available through the reaction of acetylene and an ester of carbonic acid, $(RO)_2CO$, in the presence of a strongly basic, anhydrous catalyst. The reaction is described in detail in U. S. application Serial No. 52,607, filed by Croxall and Schneider in October 2, 1948, now Patent No. 2,535,012. As there-described, acetylene is usually run into a mixture of a carbonate ester and alkaline catalyst at 20° to 110° C.

Suitable catalysts are alkali metal acetylides such as sodium or potassium acetylide, an alkali metal acoholate such as sodium methylate, ethylate, or butyrate, and strongly basic quaternary ammonium alkoxides such as benzyl trimethyl ammonium methoxide, ethoxide, or tert.-butoxide.

When the reaction has been completed, the catalyst is destroyed, as by washing it away or by neutralizing it. The products are then worked up. The principal product is generally a di-ether propionate. Along with it or in a separate fraction there may be obtained an ether acrylate. While the di-ether propionate and ether acrylate may be separated, if so desired, this is not necessary for the purpose of the present invention, as both esters lead to the same final end-products.

Pure beta-ether acrylate is obtainable from the diether propionate through dealcoholation by heating the propionate in the presence of an acidic or an alkaline catalyst as is more fully described in U. S. application Serial No. 52,608, filed by Croxall and Schneider on October 2, 1948. This is not, however, an essential step but, rather, an alternative one for convenience in handling some ether esters. It has an advantage of disposing of a mole of alcohol, ROH, prior to the reaction with a mercaptan, R'SH.

A higher boiling fraction consists of alpha,alpha-diether succinate and alpha-ether maleate, which are of interest because they have many similarities to the ether propionates and acrylates reacting likewise with mercaptans.

The esters, $(RO)_2CHCH_2COOR$ and $ROCH{=}CHCOOR$ are thus obtained from the ester $(RO)_2CO$. The alcohol portion of these esters is derived from an alcohol, ROH, which is replaced during the reaction with a mercaptan. In order to promote the latter reaction, it is desirable that the mercaptan be selected to boil higher than the alcohol ROH, which is desirably taken off by distillation. Thus, the reaction with mercaptans is particularly effective with esters from alcohols of the formula ROH, which contain up to eight carbon atoms, R being a saturated, aliphatic group joined to oxygen at a non-tertiary carbon atom thereof. It is preferred that R be a non-tertiary alkyl group of one to four carbon atoms, methyl, ethyl, propyl, or butyl, isopropyl, isobutyl, or sec.-butyl.

An example of the preparation of a typical beta,beta-diether propionate is given to illustrate the method of preparation.

There was placed in a 500 cc., three-necked flask, equipped with a gas-tight stirrer, 117 grams of a 19% solution of benzyl trimethyl ammonium ethoxide in ethanol. Excess ethanol was removed by distillation under reduced pressure until a syrupy liquid resulted, containing equimolecular proportions of ethanol and benzyl trimethyl ammonium ethoxide. To this liquid there were added with stirring and cooling 169 grams of diethyl carbonate and 20 grams of ethyl beta-ethoxyacrylate. The latter substance was added to accelerate the reaction with acetylene.

The reaction flask was then equipped with a gas inlet tube and an outlet tube. The apparatus was flushed through the inlet tube with nitrogen and then acetylene was pressed in at ten inches of mercury pressure above atmospheric. The temperature of the reaction mixture rose rapidly to 45° C. and it was necessary to supply intermittent cooling to hold the temperature at about this level. In about an hour absorption of acetylene became slow. The reactor was then cooled to room temperature. The alkaline catalyst was destroyed by careful addition of acetic acid and water, whereupon two layers formed. The upper, oily layer was separated and distilled.

The first fraction was composed of ethanol and diethyl carbonate. There was then obtained a fraction at 55°–70° C./1–2 mm., which consisted of about 90% o fethyl beta,beta-diethoxypropionate and 10% of ethyl beta-ethoxyacrylate.

These two esters may be separated upon careful refractionation through a packed column. This step is not, however, necessary as the mixture as obtained may be used directly for the transetherification reaction of this invention with entirely satisfactory results.

In place of diethyl carbonate there may be used other esters of carbonic acid and monohydric alcohols, such as methyl alcohol, propyl alcohol, isopropyl alcohol, butyl alcohol, or the like. In place of the quaternary ammonium alkoxide used as catalyst, there may be taken tetramethyl ammonium methoxide, trimethyl benzyl ammonium methoxide, dimethyl dibenzyl ammonium methoxide, trimethyl benzyl ammonium tert.-butoxide, and the like, or an alkali metal alkoxide, or an alkali metal acetylide, as shown above. Other variations in reaction conditions may be used with the ultimate separation of diether propionates, ether acrylates, or mixtures thereof.

Typical propionates serving as starting materials for the transetherification reaction are methyl beta,beta-di(methoxy)propionate, ethyl beta,beta-di(ethoxy)propionate, propyl beta,-beta-di(propoxy)propionate, and butyl beta,beta-di(butoxy)propionate, as preferred propionates, although such compounds as amyl beta,beta-di(hexoxy)propionate, hexyl beta,beta-di(hexoxy)propionate, or 2-ethylhexyl beta,beta-di-(2-ethylhexoxy)propionate may be used with large molecular sized mercaptans. Typical acrylates are methyl beta-methoxyacrylate, ethyl beta-ethoxyacrylate, propyl beta-propoxyacrylate, and butyl beta-butoxyacrylate, although, again, higher esters of beta-ether acrylates may be used, including octyl beta-octoxyacrylate.

As the second type of reactant, there is taken a mercaptan. Since a desirable requirement for such compound is that it boil at a higher temperature than the alcohol, ROH, which it displaces from the ether esters, the smallest mercaptan which can be profitably reacted is propyl mercaptan. Mercaptans as large, however, as octadecyl mercaptan are still reactive. The mercaptans used may have a straight or a branched chain; they may contain a cycle; they may be primary, secondary, or tertiary in character. In the mercaptan R'SH the group R' may be a hydrocarbon group, particularly a saturated aliphatic hydrocarbon group; but it may also be an alicyclic group or an arylaliphatic group in which the aryl group belongs to the benzene series. The group is not, however, limited to hydrocarbon; it may contain ether or thioether groups or other functional groups which are unreactive toward the catalyst selected.

Typical mercaptans to be used here include the propyl, butyl, hexyl, octyl, nonyl, decyl, dodecyl, tetradecyl, cetyl, and octadecyl mercaptans as saturated, aliphatic mercaptans which may have the thiol group attached to a primary, secondary, or tertiary carbon atom and be of straight or branched chain structure. Typical alicyclic mercaptans are cyclohexyl, dicyclopentenyl, terpenyl, methylcyclohexyl, and butylcyclohexyl mercaptans. Examples of aralkyl mercaptans include the benzyl, phenylethyl, methylbenzyl, tert.-butylbenzyl, and octylbenzyl mercaptans and the like.

Closely related to the above thiols are the thiols which contain an ether or thioether linkage. Examples of such compounds are phenoxyethyl mercaptan, phenoxypropyl mercaptan, tert.-butylphenoxyethyl mercaptan, diisobutylbutylphenoxyethyl mercaptan, sec.-octylphenoxyethyl mercaptan, phenylmercaptoethyl mercaptan, diisobutylphenylmercaptoethyl mercaptan, tert.-amylphenylmercaptopropyl mercaptan, tert.-butylphenoxyethoxyethyl mercaptan, butylphenoxypropoxyethyl mercaptan, octylphenoxyethoxyethyl mercaptan, ethoxyethyl mercaptan, butylthioethyl mercaptan, cyclohexoxyethyl mercaptan or other ether or thioether mercaptan having one to four ether linkages.

There may be used a single, pure mercaptan or a commercially pure product or a mixture of mercaptans. Mercaptans obtained as by-products in the petroleum art or prepared from olefins are useful in this invention.

For promoting the desired reaction between ether ester and mercaptan there is used a transetherifying catalyst. This catalyst may even more properly be termed an alcoholysis catalyst; i. e., a catalyst which promotes decomposition with an alcohol. Here, the effective catalysts are those which cause interchange between the RO group of the ether esters and a larger R'O group of an alcohol or the R'S group of a mercaptan boiling higher than the alcohol ROH corresponding to the original ether group. These catalysts are anhydrous, distinctly acidic or basic substances. They includes sulfonic acids such as p-toluene sulfonic acid, phosphoric acid, sulfuric acid, sodium acid sulfate, potassium acid sulfate, zinc chloride, aluminum chloride, aluminum bromide, boron trifluoride, and its oxygenated coordination complexes such as BF₃.CH₃OH, BF₃.C₂H₅OH, BF₃.C₄H₉OH, BF₃.C₂H₅OC₂H₅, BF₃.C₃H₇OC₃H₇, BF₃.C₄H₉OC₄H₉, BF₃.CH₃COCH₃, BF₃.CH₃CHO, BF₃.2CH₃COOH, etc. Effective basic catalysts include the alkali metal alcoholates such as sodium methylate, potassium ethylate, sodium butoxide, potassium hexoxide, sodium octoxide, etc.

Relatively small amounts of transetherifying catalyst are used. Only 0.01% to 1% of such catalyst is ordinarily required, leased on the weight of the reactants. Larger amounts may be used, but usually without particular advantage.

Under the influence of a small amount of a transetherifying catalyst the RO— group of ether propionate or acrylate is replaced with the R'S— group. The RO— group then appears in the form of the alcohol ROH which can be removed from the reaction mixture by volatilization, under reduced pressure, if necessary.

It should be commented that the choice of type of catalyst has an influence upon the exact type of end-product obtained. Thus, aluminum halides and the boron trifluoride catalysts tend to give dithioether propionates, if other conditions, such as proportions of reactants and time of reaction, are favorable. Strong acids and acid sulfates tend to give thioacrylates. The strong acids may also tend to give transesterification, the alcohol group of the ester being replaced with a mercaptan group when proportions, time, and temperature conditions are adapted to promote this change. The alkaline catalysts tend to give both transetherification and transesterification, and several types of products are usually separable from alkaline-promoted reaction mixtures.

In effecting the reaction of beta-diether propionate and/or beta-ether acrylate and mercaptan, one proceeds by mixing the two types of reactants together with a small amount of catalyst. The mixture is heated to 90° C. to 250° C., preferably 100° to 200° C. The alcohol displaced from the ether group of the ether-substituted ester is taken off. When only transetherification is desired, the reaction is interrupted when two moles of alcohol per mole of diether-propionate have been obtained or one mole of alcohol per mole of ether-acrylate has been obtained. To continue the reaction in the presence of excess mercaptan may cause other changes to take place. The catalyst is destroyed or removed by neutralizing or by washing with water. The products are then worked up. Usually they are separable through distillation under reduced pressure.

The thioether acrylates and the di(thioether)-propionates prepared according to this invention are useful as antioxidants, chemical intermediates, polymerization regulators, solvents, and the like.

The following examples are illustrative of the preparation of beta-thioacrylates.

*Example 1*

There were placed in a reaction flask equipped with a 1.5 ft., packed column 95 grams of ethyl beta,beta-diethoxypropionate, 90 grams of butyl mercaptan, and 0.1 gram of sodium hydrogen sulfate. This mixture was heated until reflux started in the column. There was then distilled off at overhead temperatures of 74° C. to 79° C. ethyl alcohol in an amount of 59 grams. There was then taken off at distillation temperatures from 80° C. to 95° C. a fraction which consisted of ethyl alcohol and butyl mercaptan. Heating was continued with the apparatus under reduced pressure. Additional butyl mercaptan was taken off and then there was obtained a fraction between 58° C./4 mm. and 100° C./2 mm. which consisted of butyl mercaptan, ethyl beta-ethoxyacrylate, and ethyl beta-butylthioacrylate. A fraction of 38 grams was then distilled at 100° C.–107° C./2 mm. It had a refractive index, $n_D^{20}$, of 1.4990, a molecular refraction, $MR_D$, of 55.20, a density, $$d_{20}^{20}$$

of 1.001, and a saponification equivalent of 187. By analysis it contained 57.8% of carbon and 8.66% of hydrogen. Theoretical values for ethyl beta-butylthioacrylate are $MR_D$, 54.65; saponification equivalent, 188; carbon content, 57.7%; and hydrogen content, 8.55%. This fraction was therefore, ethyl beta-butylthioacrylate and represented a yield of 51%.

Substitution of an equivalent weight of ethyl beta-ethoxyacrylate for the 95 grams (0.5 mole) of ethyl beta,beta-diethoxypropionate used above leads to the same end-product, ethyl beta-butylthioacrylate.

*Example 2*

A mixture of 87.4 grams of ethyl beta,beta-diethoxypropionate, 67 grams of n-octyl mercaptan, and 0.5 gram of sodium hydrogen sulfate was heated in a reaction vessel. There were distilled therefrom at 78° to 81° C. about 40 grams of ethanol. The temperature of the reaction mixture increased from 110° C. to 220° C. The reaction mixture was then heated under reduced pressure. After a forerun of 12 grams at 45° C./0.35 mm. to 130° C./0.23 mm., consisting of n-octyl mercaptan, ethyl beta-ethoxyacrylate, and ethyl beta-octylthioacrylate, there was obtained a fraction of 72 grams, distilling at 130° C.–132° C./0.23 mm. This fraction was found to be ethyl beta-octylthioacrylate. It had a refractive index, $n_D^{20}$, of 1.4941, a carbon content of 64.40%, a hydrogen content of 10.10%, and a sulfur content of 13.82%. Theoretical values for $C_{13}H_{24}O_2S$ are carbon, 63.94%; hydrogen, 9.84%; and sulfur, 13.11%. Another fraction was obtained at 132° C./0.23 mm. to 134° C./0.3 mm. It had a refractive index of 1.4950 and was chiefly ethyl beta-n-octylthioacrylate. The total yield of product was over 75%.

In place of the ethyl beta,beta-diethoxypropionate used above, there may be used equimolecular proportions of methyl beta,beta-dimethoxypropionate, propyl beta,beta-dipropoxypropionate, or butyl beta,beta-dibutoxypropionate, or the like. The products which result when octyl mercaptan is combined with the above-mentioned reactants are, respectively, methyl beta-octylthioacrylate, propyl beta-octylthioacrylate, butyl beta-octylthioacrylate and the like.

*Example 3*

A reaction vessel was charged with 95 grams of ethyl beta,beta-diethoxypropionate, 101 grams of tert.-dodecyl mercaptan, and 0.5 gram of sodium hydrogen sulfate. The mixture was heated to about 119° C. at which temperature ethyl alcohol was obtained from a packed column of the apparatus. While vapor temperatures varied from 79° C. to 82° C., about 41 grams of ethyl alcohol were taken off. The temperature of the reaction mixture gradually increased to 178° C. Distillation was then continued under reduced pressure. A fraction was collected at 42° C./0.5 mm. to 138° C./0.42 mm. amounting to 26.5 grams and consisting of a mixture of tert.-dodecyl mercaptan, ethyl beta-ethoxyacrylate, and ethyl beta-dodecylthioacrylate. There was then obtained a fraction which was found to be ethyl beta-tert.-dodecylthioacrylate. It distilled at 138° C./0.42 mm.–148° C./0.60 mm., had a refractive index, $n_D^{20}$, of 1.5005, and contained 67.83% of carbon, 10.76% of sulfur. Another fraction was distilled at 148° C.–152° C./0.6 mm., amounting to 20 grams, having a refractive index, $n_D^{20}$, of 1.5036, and consisting principally of ethyl beta-tert.-dodecylthioacrylate.

Other mercaptans may be substituted for the above. In particular, the $C_{14}$ mercaptans obtained from olefins or the mixture of mercaptans made from kerosenes, averaging about $C_{16}$ in molecular size, give products closely resembling the ethyl beta-dodecylthioacrylate prepared in Example 3.

In place of the various aliphatic mercaptans discussed above, here may be used cycle-containing mercaptans. These include alicyclic and arylaliphatic mercaptans, such as cyclohexyl mercaptan, benzyl mercaptan, phenoxyethyl mercaptan, butylphenoxyethyl mercaptan, diisobutylphenoxyethyl mercaptan, etc.

*Example 4*

A reaction vessel was charged with 148 grams of methyl beta,beta-di(methoxy)propionate, 124 grams of benzyl mercaptan, and one gram of potassium acid sulfate. The mixture was stirred and heated to about 130° C. Methyl alcohol was evolved and removed through a short distilling column. Distillation was completed under reduced pressure. There was taken off a fraction containing methyl beta-methoxyacrylate, benzyl mercaptan, and methyl beta-benzylthioacrylate. The material remaining was filtered, washed, and dried. It corresponded in composition to methyl beta-benzylthioacrylate.

Use of phenoxyethyl mercaptan in place of benzyl mercaptan leads to the formation of methyl beta(phenoxyethylthio)acrylate. Cyclohexyl mercaptan yields a product which corresponds in composition to methyl beta-cyclohexylthioacrylate.

The substitution of a boron trifluoride catalyst for the alkali metal acid sulfates leads primarily to propionates. The boron trifluoride catalyst may be any of the complexes formed by boron trifluoride with oxygenated organic compounds, such as alcohols, aldehydes, carboxylic acids, ketones, or ethers. The use of such a catalyst is shown in the following example.

Example 5

A mixture of 93 grams of ethyl beta,beta-diethoxypropionate (0.49 mole), 88 grams of n-butyl mercaptan (0.98 mole), 100 grams of "topped" toluene, and 2 cc. of diethyl ether-boron trifluoride was heated in a 500 ml. flask with a 1 ft. packed column. There was obtained 67 grams of a toluene-ethanol azeotrope which distilled at 74–77° C. (It was calculated that there would be 67 grams of a toluene-ethanol azeotrope which distils at 76.7° C. and contains 68% of ethanol.) The excess toluene was removed by heating the residue to 90° C. and stripping at 30 mm. pressure. The residue was diluted with ether and washed thoroughly with water. The oil layer was dried over a soluble anhydrite overnight. The ether was distilled at atmospheric pressure and the distillation of the residue was continued at reduced pressure. There was obtained 33 grams of a 55% mixture of ethyl beta-n-butylthioacrylate and ethyl beta,beta-di-n-butylthiopropionate (as estimated from sulfur analysis), which distilled at 53°–128° C./2 mm. and had a refractive index, $n_D^{20}$, of 1.4946. There was obtained 73 grams of ethyl beta,beta-di-n-butylthiopropionate which distilled at 133°–154° C./<1 mm. This is a yield of 79.3%. On redistillation the product boiled at 138°–143° C./<1 mm. and had a refractive index, $n_D^{20}$, of 1.4866. Theoretical values for ethyl beta,beta-di-n-butylthiopropionate $$(C_{13}H_{26}O_2S_2)$$

show a carbon content of 56.11%, a hydrogen content of 9.36%, and a sulfur content of 23.02%. On analysis, the product had a carbon content of 56.39%, a hydrogen content of 9.48%, and a sulfur content of 22.79%.

When an anhydrous, fixed, strongly basic catalyst is used with a mercaptan and an ether propionate or acrylate, alcohol is displaced from both ether and ester groups of the ether propionate or acrylate. There result thiolacrylates, such as actyl beta-octylmercaptothiolacrylate, dodecyl beta-dodecylmercaptothiolacrylate, and the like, the formula for such compounds being $$R'SCH=CHCOSR'$$

This reaction is illustrated by the following example.

Example 6

A mixture of 95 grams (0.5 mole) of ethyl beta,beta-diethoxypropionate, 153 grams (1.05 moles) of n-octyl mercaptan, and 2 grams of sodium dissolved in 20 ml. of anhydrous ethanol was heated in a Claisen flask. There was obtained on distillation 58 grams of ethanol which boiled at 78°–79° C. The cooled residue was poured into water containing 7 ml. of concentrated hydrochloric acid. The resulting oil was removed by extraction with ether. The extracts were washed with water until the washings were neutral, dried over anhydrous calcium sulfate, and distilled. After removal of ether there was obtained 25 grams of a mixture of ethyl beta-ethoxyacrylate and octyl mercaptan which distilled at 45°–104° C./0.6 mm. and had a refractive index, $n_D^{20}$, of 1.4566, 58 grams of a mixture of ethyl beta-(n-octylthio)acrylate and ethyl beta,beta-di(n-octylthio)propionate which distilled at 101°–185° C./0.2 mm. and which partially crystallized, and 101 grams of ethyl beta,beta-di(n-octylthio)propionate which distilled at 176°–197° C./0.15 mm., had a refractive index $n_D^{20}$, of 1.4820, and, upon analysis, had a sulfur content of 16.55%. The calculated sulfur content for ethyl beta,beta-di(n-octylthio)propionate $$(C_{21}H_{42}O_2S_2)$$

is 16.41%.

The primary reaction between a mercaptan, R'SH, and an ether ester, $(RO)_nCHCH_nCOOR$, in the presence of a transetherifying catalyst leads to the compound $(R'S)_nCHCH_nCOOR$. If the starting ether ester is an ether acrylate, $ROCH=CHCOOR$, there is formed the thioether acrylate, $R'SCH=CHCOOR$. If the reaction mixture contains excess mercaptan and is allowed to cool in the presence of catalyst, there is formed at least some of the di(thioether) ester, $(R'S)_2CHCH_2COOR$. If the starting material is a diether propionate, there may be obtained similarly thioether acrylate or di(thioether) propionate or a mixture thereof, depending upon the choice of catalysts and reaction conditions. Thus, $$ROCH=CHCOOR \text{ or } (RO)_2CHCH_2COOR$$
$$\downarrow + R'SH$$
$$R'SCH=CHCOOR$$
$$\downarrow + R'SH$$
$$(R'S)_2CHCH_2COOR$$
$$\downarrow + R'SH$$
$$(R'S)_2CHCH_2COSR' \longleftrightarrow (R'S)CH=CHCOSR'$$

Reactions comparable to those observed with beta-ether propionates and beta-ether acrylates have also been found to take place with alpha,alpha-diether succinates $$(RO)_2C-COOR$$
$$H_2C-COOR$$

and alpha-ether maleates $$ROC-COOR$$
$$HC-COOR$$

In the presence of a boron trifluoride catalyst, as a typical transetherification catalyst, the ether groups are displaced by mercapto groups with formation of alpha-alkyl-, alpha-phenylalkyl-, or alpha-cycloalkyl-mercaptomaleates

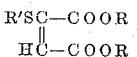

and succinates

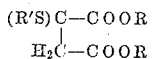

The succinates and maleates with ether substituents are formed in the reaction of acetylene and carbonate esters, as noted above.

We claim:

1. A process which comprises reacting by heating together at 90° to 250° C. in the presence of an alcoholysis catalyst a mercaptan, R'SH, and an ether ester, $(RO)_n CHCH_n COOR$, and separating an alcohol, ROH, from the reaction mixture, $n$ representing an integer from one to two, R representing a monovalent, saturated, aliphatic hydrocarbon radical, attached to oxygen at a non-tertiary carbon atom thereof and containing not over eight carbon atoms, R' representing the residue of the mercaptan, R'SH, which boils higher than the alcohol ROH and which is a member of the class consisting of alkyl and phenyl-alkyl mercaptans of not over 18 carbon atoms.

2. The process of claim 1 wherein the catalyst is an alkali metal acid sulfate.

3. A process which comprises reacting by heating together at 90° to 250° C. in the presence of an alcoholysis catalyst an alkyl mercaptan, R'SH, and a diether propionate, $(RO)_2 CHCH_2 COOR$, and separating from the reaction mixture an alcohol, ROH, the mercaptan R'SH boiling higher than the alcohol ROH, R representing an alkyl group of not over four carbon atoms and R' representing an alkyl group of not over eighteen carbon atoms.

4. The process of claim 3 wherein the catalyst is an alkali metal acid sulfate.

5. A process which comprises reacting by heating together at 100° to 200° C. in the presence of an acidic alcoholysis catalyst an alkyl mercaptan, R'SH, and an ether ester, $(RO)CH=CHCOOR$, and separating from the reaction mixture an alcohol, ROH, the mercaptan R'SH boiling higher than the alcohol ROH, R representing an alkyl group of not over four carbon atoms and R' representing an alkyl group of not over eighteen carbon atoms.

6. The process of claim 5 wherein the catalyst is an alkali metal acid sulfate.

WILLARD J. CROXALL.
JOHN O. VAN HOOK.

No references cited.